(12) United States Patent
Ukai et al.

(10) Patent No.: US 8,175,771 B2
(45) Date of Patent: May 8, 2012

(54) CONTROL APPARATUS FOR ELECTRIC POWER STEERING SYSTEM

(75) Inventors: Hiroyuki Ukai, Nagoya (JP); Yoshifumi Morita, Nagoya (JP); Makoto Iwasaki, Nagoya (JP); Nobuyuki Matsui, Nagoya (JP); Norio Tsuchida, Nagoya (JP); Yuya Yamamoto, Nagoya (JP); Jiro Hayashi, Aichi-ken (JP); Akihiko Sawada, Anjo (JP); Nobuhiko Makino, Anjo (JP)

(73) Assignees: National University Corporation Nagoya Institute of Technology, Nagoya (JP); Denso Corporation, Kariya (JP)

(*) Notice: Subject to any disclaimer, the term of this patent is extended or adjusted under 35 U.S.C. 154(b) by 873 days.

(21) Appl. No.: 12/136,352

(22) Filed: Jun. 10, 2008

(65) Prior Publication Data

US 2008/0306655 A1 Dec. 11, 2008

(30) Foreign Application Priority Data

Jun. 11, 2007 (JP) ................................. 2007-154332

(51) Int. Cl.
*B62D 5/04* (2006.01)
*B62D 6/00* (2006.01)

(52) U.S. Cl. .............. 701/41; 701/42; 701/44; 180/443; 180/446

(58) Field of Classification Search .................... 701/41, 701/42, 44; 180/443, 444, 446
See application file for complete search history.

(56) References Cited

U.S. PATENT DOCUMENTS

| | | | |
|---|---|---|---|
| 5,389,867 A | 2/1995 | Adachi et al. | |
| 6,112,846 A * | 9/2000 | Mukai et al. | 180/446 |
| 6,148,948 A * | 11/2000 | Shimizu et al. | 180/446 |
| 6,594,569 B2 | 7/2003 | Yasuda | |
| 6,691,008 B2 * | 2/2004 | Kondo et al. | 701/41 |
| 6,876,910 B2 | 4/2005 | Kifuku | |
| 7,136,732 B2 * | 11/2006 | Shimizu et al. | 701/41 |
| 2004/0189239 A1 | 9/2004 | Islam et al. | |

FOREIGN PATENT DOCUMENTS

| | | |
|---|---|---|
| DE | 43 00 366 A1 | 7/1993 |
| EP | 1 508 500 A1 | 2/2005 |
| JP | 2000-103349 | 4/2000 |
| JP | 2002-293257 | 10/2002 |

OTHER PUBLICATIONS

European Search Report (7 pgs.) dated Dec. 19, 2011 issued in corresponding European Application No. 08010646.1.

* cited by examiner

*Primary Examiner* — Kevin Hurley
*Assistant Examiner* — Marc Scharich
(74) *Attorney, Agent, or Firm* — Nixon & Vanderhye P.C.

(57) ABSTRACT

There is provided a control apparatus that controls a motor of an electric power steering system to assist a steering effort of an operator. The control apparatus includes a sensor, a parameter computer, a difference computer, a target torque computer, and a motor driver. The parameter computer computes a current value of one of physical parameters of one of constituents of the electric power steering system based on a steering parameter determined by the sensor referring to an equation of motion. The difference computer computes a difference between the current value of the one of the physical parameters computed by the parameter computer and a predetermined value of the one of the physical parameters. The target torque computer computes a target torque of the motor which compensates for the difference between the current value and the predetermined value of the one of the physical parameters.

6 Claims, 16 Drawing Sheets

CONTROL APPARATUS FOR ELECTRIC POWER STEERING SYSTEM

CROSS REFERENCE TO RELATED APPLICATION

The present application relates to and incorporated by reference Japanese Patent Application No. 2007-154332 filed on Jun. 11, 2007.

BACKGROUND OF THE INVENTION

1. The Field of the Invention

The present invention relates to a control apparatus and method for an electric power steering system that transmits mechanical power from an electric motor to a steering system of a vehicle to reduce a required steering torque, in particular, a method and apparatus for automatically compensating for a change in steering characteristics of vehicle-mounted electric power steering system over time due to component deterioration with age to maintain input-output characteristics of the electric power steering system.

2. Description of the Related Art

An electric power steering system includes an electric motor to assist steering effort of an operator of a vehicle in a manner where so-called assist steering torque that is a driving force is applied from the electric motor in response to a steering operation of the operator under a control of a control device. A conventional electric power steering system determines the assist steering torque based on a steering torque applied from the operator of the vehicle to a steering shaft connected to a steering wheel and controls an output torque of an electric motor connected to a steering system based on the assist steering torque.

Steering feeling of the operator is determined by steering characteristics which are expressed by relationships between the steering torque applied from the operator of the vehicle and the output torque of the electric motor for assisting the steering operation of the operator, which is stored as a map in a control device of the electric power steering system. In general, the steering characteristics have been tuned up and optimized before the vehicle provided with the electric power steering system is delivered from a vendor to a user. However, long use of the electric power steering system causes a deterioration of the steering feeling of the operator because mechanical characteristics of the steering system such as a viscous friction coefficient of the steering shaft, a shaft of the electric motor, and the like, are changed.

Yasuda discloses in Japanese Laid-Open Patent Application No. 2002-293257 and in the corresponding U.S. Pat. No. 6,594,569 a device and method for setting steering characteristics of an electric power steering system. In this device, an operator of a vehicle providing with the device can observe a steering characteristics diagram that, for example, shows a relationship between a steering torque applied by the operator and an target value of motor current which is to be supplied to an electric motor of the electric power steering system to assist the steering effort of the operator, a relationship between an angle of a steering wheel and the target value of the motor current, and a relationship between an angular velocity of a steering wheel and the target value of the motor current, on a diagram display screen during operating the vehicle. The steering characteristics diagram is stored as an assist map in a memory of the electric power steering system. Further, the operator can reset, alter, and compile the steering characteristics diagram to vary the steering characteristics and steering feeling. This compilation of the steering characteristics diagram would be performed in order to achieve the optimum steering feeling in accordance with a vehicle model, operator's preferences, driving conditions of the vehicle such as weight of a load carried by the vehicle used hours of the electric power steering system. In particular, it is possible to reset the steering characteristics to return to a default characteristics which is set before the vehicle provided with the electric power steering system is delivered from a vendor to a user.

However, in this device the operator needs to manually alter the steering characteristics diagram to adjust the steering characteristics to favorable ones of the operator by himself. There may be an operator who cannot easily and quickly operate the compilation of the steering characteristics diagram because the operator has not been familiarized with operation of the compilation. Further, it is not easy to fine-tune the steering characteristics to reset the steering characteristics diagram for obtaining the default characteristics.

Further, Kifuku discloses in Japanese Laid-Open Patent Application No. 2000-103349 and in the corresponding U.S. Pat. No. 6,876,910 a vehicle-mounted electric power steering system in which an electric motor assists steering torque to improve steering feeling of an operator of a vehicle by estimating static friction, Coulomb friction, viscous friction, and inertia of the power steering system and compensating for these frictions and the inertia.

The electric power steering system includes a separately driven DC motor that generates steering assist force for assisting steering torque of an operator by his operation of a steering wheel in response to an input electric current $I_{in}$. The steering assist force is determined based on a steering torque applied to a steering shaft connected to a steering wheel, speed of the vehicle, angular velocity of the motor, and an angular acceleration of the motor. The angular velocity and the angular acceleration of the motor are estimated based on a motor current that flows in the motor and an applied electric voltage. The input electric current $I_{in}$ of the motor is obtained by summing a static friction compensation current $I_f$, a Coulomb friction compensation current $I_C$, a viscous friction compensation current $I_d$, an inertia compensation current $I_j$, and an assist current $I_s$ together.

The static friction compensation current $I_f$ is computed based on an estimated value of static friction of the power steering system that is estimated from a steering torque inputted from the operator to the steering system. The estimated value of the static friction is estimated based on a fact that the static friction influences on steering feeling of the operator, for example, an uncomfortable feeling in which the operator feels as if the steering wheel is stuck when the operator starts to operate the steering wheel especially around a neutral position of the steering wheel. Hence, the estimated value of the static friction is computed from change in the steering torque over time. The Coulomb friction compensation current $I_C$ has a constant value when the angular velocity of the motor exceeds a predetermined value. The viscous friction compensation current $I_d$ is linearly proportional to the angular velocity of the motor. The inertia compensation current $I_j$ is linearly proportional to the angular acceleration of the motor. The assist current $I_s$ is computed based on the speed of the vehicle and the steering torque inputted by the operator of the vehicle to the steering wheel.

However, the constant value of the Coulomb friction compensation current $I_C$, relationship between the viscous friction compensation current $I_d$, and the angular acceleration of the motor, relationship between the inertia compensation current $I_j$ and the angular acceleration of the motor, and relationships between the assist current $I_x$ and each of the speed of the vehicle and the steering torque, are predetermined so that variations of values of the above mentioned frictions and the inertia of the steering system due to mechanical deteriorations of constituents of the steering system caused by long use of the steering system haven not been taken into consideration. Further, only the value of the static friction is explicitly estimated. Hence, explicit values of the Coulomb friction and the viscous friction are not obtained. Therefore, steering feeling of the operator is impaired when mechanical characteristics of the steering system such as the value of the viscous friction of the steering shaft, a shaft of the electric motor, and the like, are changed.

Further, even if techniques of Yasuda would be combined with those of Kifuku, an apparatus that automatically compensates for a change in steering characteristics of vehicle-mounted electric power steering system over time due to component deterioration with age to maintain optimum values of parameters of the electric power steering system can not be currently obtained.

Therefore, it is desired a method and apparatus for compensating a change in steering characteristics of vehicle-mounted electric power steering system over time due to component deterioration with age to keep comfortable steering feeling of an operator even if the electric power steering system would be used for long time.

SUMMARY OF THE INVENTION

The present invention has been made to solve the above-mentioned problems, and therefore an object of the present invention is to provide a method and apparatus for compensating a change in steering characteristics of vehicle-mounted electric power steering system over time to automatically maintain optimum values of parameters of the electric power steering system which have been set as default values.

According to a first aspect of the present invention, there is provided a control apparatus that controls a motor of an electric power steering system to assist a steering effort of an operator. The control apparatus includes a sensor, a parameter computer, a difference computer, a target torque computer, and a motor driver. The sensor determines a steering parameter expressing a condition of a steering operation of the operator. The parameter computer computes a current value of one of physical parameters of one of constituents of the electric power steering system based on the steering parameter determined by the sensor referring to an equation of motion of the one of the electric power steering system to be satisfied during the steering operation of the operator in which the one of the constituents is treated as a rigid body and the physical parameter is included. The difference computer computes a difference between the current value of the one of the physical parameters computed by the parameter computer and a predetermined value of the one of the physical parameters. The target torque computer computes a target torque of the motor which compensates for the difference between the current value and the predetermined value of the one of the physical parameters. The motor driver drives the motor to generate the target torque so that a steering feeling of the operator is maintained against a change in value of the physical parameter.

Hence, even if the long use of the electric power steering system cause the deteriorations of the constituents thereof, the optimum steering feeling of the operator which is set before the vehicle has been delivered can be maintained.

According to a second aspect of the present invention, there is provided a control apparatus that includes the sensor, the parameter computer, the difference computer, the target torque computer, and the motor driver, wherein the parameter computer performs an online identification method for computing the current value of the physical parameter of the one of the constituents of the electric power steering system based on the equation of motion and the steering parameter determined by the sensor.

According to a second aspect of the present invention, there is provided a method for controlling a motor of an electric power steering system to assist a steering effort of an operator. The method includes steps of: determining a steering parameter expressing a condition of a steering operation of the operator; computing a current value of one of physical parameters of one of constituents of the electric power steering system based on the steering parameter referring to an equation of motion of the one of the electric power steering system to be satisfied during the steering operation of the operator in which the one of the constituents is treated as a rigid body and the physical parameter is included; computing a difference between the current value of the one of the physical parameters and a predetermined value of the one of the physical parameters; computing a target torque of the motor which compensates the difference between the current value and the predetermined value of the one of the physical parameters; and driving the motor to generate the target torque as the output torque of the motor so that a steering feeling of the operator is maintained against a change in value of the physical parameter.

Hence, even if the long use of the electric power steering system cause the deteriorations of the constituents thereof, the optimum steering feeling of the operator which is set before the vehicle has been delivered can be maintained.

BRIEF DESCRIPTION OF THE DRAWINGS

The present invention will be understood more fully from the detailed description to be given hereinbelow and from the accompanying drawings of the preferred embodiment of the invention, which is not taken to limit the invention to the specific embodiments but should be recognized for the purpose of explanation and understanding only.

In the drawings.

DESCRIPTION OF THE PREFERRED EMBODIMENT

Figure 1:
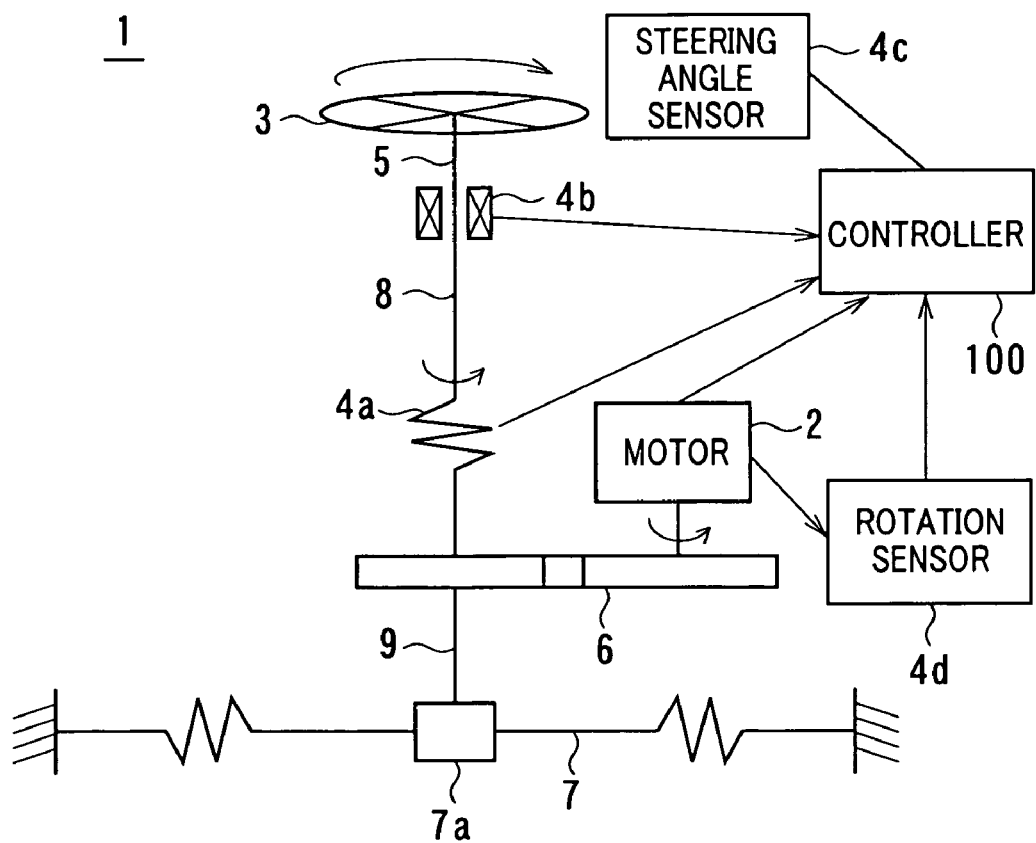
FIG. 1 is a diagram showing a whole constitution of an electric power steering system according to the present invention.

Preferred embodiment of a control apparatus and method for an electric power steering system that transmits mechanical power from an electric motor to a steering system of a vehicle to reduce a required steering torque according to the present invention will be explained below with reference to attached drawings. Identical sections are denoted by the same reference numerals throughout the drawings. The following description of the preferred embodiment is merely exemplary in nature and is in no way intended to limit the invention, its application, or uses.

FIG. 1 schematically shows a whole constitution of an electric power steering (EPS) apparatus 1 according to the present invention. In the EPS system 1 mounted in a vehicle operated by an operator, steering torque of a steering wheel 3 applied by the operator is transmitted to a rack-pinion gear 7a through an input shaft 5 and an axis of a pinion 9. The input shaft 5 and the axis of a pinion 9 constitute of a steering shaft 8, and are coupled to each other by a torsion bar. The torsion bar is distorted according to the steering torque. The rotational force that is received by the axis of the pinion 9 changes into a linear motion in a direction of an axis of a rack 7 so that a direction of travel of road wheels of the vehicle through a tie rod is changed by an angle proportional to a length of the linear motion of the axis of the rack 7.

At the same time, a rotary torque sensor 4a and a steering wheel angle sensor 4b are mounted on the input shaft 5 of the steering shaft 8, and are connected to the EPS controller 100. The steering torque sensor 4a determines a rotary torque $T_{xn}$ applied to the steering shaft 8 on the basis of a direction and amount of the distortion of the torsion bar, and outputs a first signal indicating the direction and amount of the distortion. For example, the torque sensor 4a is of a magnetic type which is configured to detect a magnetic resistance determined by a relative rotational angle between the input shaft 5 and the axis of a pinion 9. The steering wheel angle sensor 4b detects a steering angle $\theta_N$ of the steering wheel 3, and outputs a second signal indicating the steering angle $\theta_s$ of the steering wheel 3.

The axis of the pinion 9 is receives a rotary torque generated by an electric motor 2 via a gear 6. The rotary torque generated by the motor 2 assists a steering operation of the operator. The motor 2 is controlled by a controller 100 to which a steering torque sensor 4c that determines a steering torque $T_s$ applied by the operator to the steering wheel 3 and outputs a third signal indicating the steering torque $T_s$. A first rotation angle sensor 4d is connected to the motor 2 to determine a first rotation angle $\theta_m$ of a motor shaft of the motor 2 and outputs a fourth signal indicating the first rotation angle $\theta_m$ of the motor shaft of the motor 2. The rotation of the motor 2 is transmitted to the axis of the pinion 9 with a reduction ratio n.

A second rotation angle sensor 4e is connected to the axis of the pinion 9 to determine a second rotation angle $\theta_0$ of the axis of the pinion 9 and outputs a fifth signal indicating the second rotation angle $\theta_0$ of the axis of the pinion 9.

The controller 100 receives the first signal indicating the direction and amount of the distortion from which the rotary torque $T_{sn}$ is obtained, the second signal indicating the steering angle $\theta_s$ of the steering wheel 3, the third signal indicating the steering torque $T_s$, the fourth signal indicating the first rotation angle $\theta_m$ of the motor 2, and fifth signal indicating the second rotation angle $\theta_0$ of the axis of the pinion 9, and outputs an electric current $i_a$ (hereinafter it is referred to as "motor current") that is supplied to the motor 2. The motor current $i_a$ determines an assist torque that assists a steering operation of the operator.

It is allowed that the motor 2 connects to sensors such as a first motor torque sensor that determines an output torque of the motor 2, the axis of the pinion 9 connects to a second motor torque sensor that determines a transmitted power of the motor amplified by the gear 6, and the motor 2 connects to an electric current sensor that determines an internal electric current that flows in the motor 2, and the like.

Figure 2:
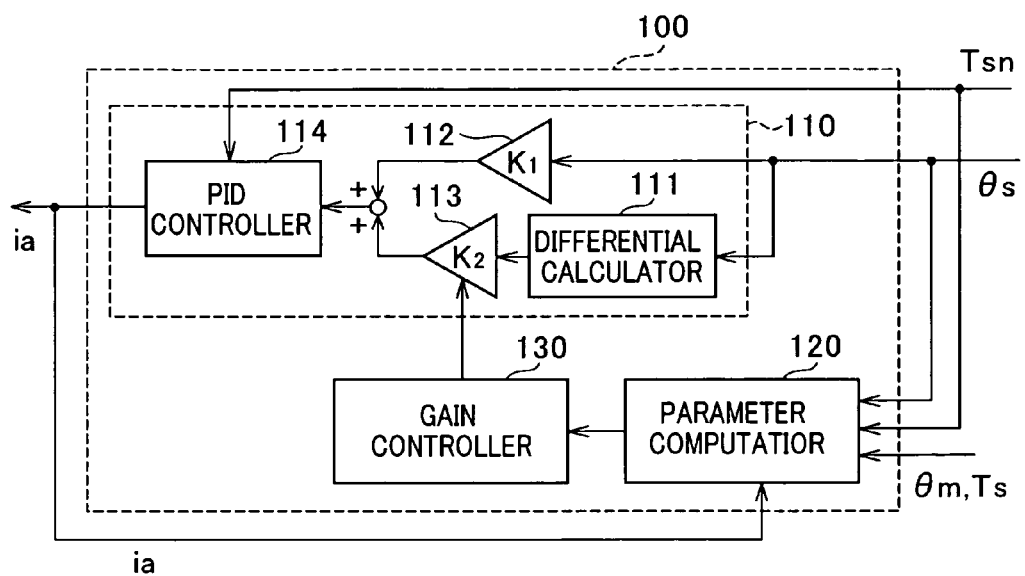
FIG. 2 is a block diagram showing electrical construction of a controller of the electric power steering system.

FIG. 2 is a block diagram that shows electrical construction of the controller 100 of the electric power steering system 1.

The controller 100 includes a motor current determination section 110, a parameter estimation section 120, and a gain control section 130. The motor current determination section 110 includes a motor driver. The parameter estimation section 120 is configured to perform functions of a parameter computer and a difference computer. The gain control section 130 corresponds to a target torque computer.

The motor current determination section 110 outputs the motor current $i_a$ that is applied to the motor 2 and determines a target value of the assist torque as a function of the rotary torque $T_{sn}$ determined by the steering torque sensor 4a and the steering angle $\theta_s$ of the steering wheel 3 determined by the steering wheel angle sensor 4b.

The motor current determination section 110 includes a differential calculator 111, a first amplifier 112, a second amplifier 113, and a proportional-integral-derivative (PID) controller 114. The differential calculator 111 receives the second signal indicating the steering angle $\theta_s$ of the steering wheel 3 from the steering wheel angle sensor 4b and outputs a differential value $\dot{\theta}_s$ of the steering angle $\theta_s$. The first amplifier 112 amplifies the value of the steering angle $\theta_s$ by a gain $K_1$ to output a first amplifier signal indicating a gained differential value $K_1\dot{\theta}_N$. The second amplifier 113 amplifies the differential value $\dot{\theta}_s$ of the steering angle $\theta_s$ obtained by the differential calculator 111 by a gain $K_2$ to output a second amplifier signal indicating a gained value $K_2\theta_x$.

The PID controller 114 receives a sum of the first amplifier signal and the second amplifier signal. The sum $K_1\dot{\theta}_s K_2\theta_s$ determines a target value $T_{snref}$ of the output torque of the motor 2. The PID controller 114 calculates and outputs the electric current $i_n$ to the motor 2 so as to eliminate a difference between the target value $T_{snref}$ of the output torque of the motor 2 and the rotary torque $T_{sn}$ determined by the steering torque sensor 4a. The electric current $i_a$ outputted from the PID controller 114 of the controller 100 drives the motor 2 to generate the assist steering torque that assists the steering operation of the operator.

As mentioned above, the assist steering torque is determined as a function of the target value $T_{snref}$ of the output torque of the motor 2, and the target value $T_{snref}$ is varied when at least one of the gain $K_1$ of the first amplifier 112 and the gain $K_2$ of the second amplifier 113 is changed. The gain $K_1$ of the first amplifier 112 and the gain $K_2$ of the second amplifier 113 are set to default values which lead to an optimum steering feeling of the operator before the vehicle has delivered from a vendor.

However, long use of the electric power steering system 1 causes a deterioration of the steering feeling of the operator. The controller 100 includes the parameter estimation section 120 and the gain control section 130 to maintain the steering feeling of the operator since start of use of the electric power steering system 1 in a manner where the gain $K_2$ of the second amplifier 113 is changed in accordance with the deterioration of the steering feeling of the operator. Steering feeling of the operator is determined by a relationship between the rotary torque $T_{sn}$ applied from the operator of the vehicle and the transmitted power of the motor 2 amplified by the gear 6 for assisting the steering operation of the operator. In general, this relationship is changed over time due to so-called an component deterioration with age that deteriorate mechanical characteristics of constituents of the electric power steering system 1, for example, power transmission characteristics between the steering wheel 3 and the input shaft 5, and the like. The change in the gain $K_2$ of the second amplifier 113 compensates for deterioration of the mechanical characteristics of the electric power steering system 1.

In the present embodiment, only the gain $K_2$ of the second amplifier 113; is changed. However, it is allowed that both of the gain $K_1$ of the first amplifier 112 and the gain $K_2$ of the second amplifier 113 are changed to maintain the steering feeling of the operator.

The controller 100 comprises a central processing unit that entirely controls the controller 100 and accommodates a memory including a read only memory (ROM), a random access memory (RAM), for example, EEPROM, a motor driver, and an interface controller. The motor driver drives the motor 2 based on a control signal applied from the CPU. The ROM stores a control program, and the RAM temporarily stores input signals of the controller 100 including the first signal indicating the direction and amount of the distortion from which the rotary torque $T_{sn}$ is obtained, the second signal indicating the steering angle $\theta_s$ of the steering wheel 3, the third signal indicating the steering torque $T_s$, the fourth signal indicating the first rotation angle $\theta_m$ of the motor 2, and the fifth signal indicating the second rotation angle $\theta_0$ of the axis of the pinion 9.

The parameter estimation section 120 stores a parameter estimation program that is performed to estimate at least one of physical parameters of the electric power steering system 1:

a first Inertia $J_s$ of the steering wheel 3,
a second inertia $J_0$ of the axis of the pinion 9,
a third inertia $J_m$ of the shaft of the motor 6,
a first viscous friction coefficient $C_N$ of the steering wheel 3,
a second viscous friction coefficient $C_0$ of the axis of the pinion 9,
a third viscous friction coefficient $C_m$ of the motor 6,
a fourth viscous friction coefficient $C_R$ of the rack 7,
a first spring constant $K_T$ of the torsion bar,
a second spring constant $K_R$ of the rack 7,
a first Coulomb friction coefficient $F_{Cs}$ of the steering wheel 3,
a second Coulomb friction coefficient $F_0$ of the axis of the pinion 9,
a reduction gear ratio n,
a relative stroke p,
a torque constant $K_{tr}$, and
a mass $M_R$ of the rack 7,
on the basis of the input signals of the controller 100. The relative stroke p is also called as a rack gain that is defined as a traveling length of the rack 7 when the pinion 9 is rotated by 360 degrees. Using the above mentioned physical parameters, equations of motions of the constituents of the electric power steering system 1 can be written down as follows:

$$T_s = J_s\ddot{\theta}_s + C_s\dot{\theta}_s + T_{sn} + F_{Cs}, \quad (1)$$

$$T_{sn} = K_T(\theta_s - \theta_0), \quad (2)$$

$$nK_{tr}i_a + K_T\theta_s = J\ddot{\theta}_0 + C\dot{\theta}_0 + K\theta_0 + F_0, \quad (3)$$

$$\theta_m = n\theta_0, \quad (4)$$

where, in equation (3), $$J = J_0 + n^2 J_m + \left(\frac{p}{2\pi}\right)^2 M_R, \quad (5)$$

$$C = C_0 + n^2 C_m + \left(\frac{p}{2\pi}\right)^2 C_R, \quad (6)$$

$$K = K_T + \left(\frac{p}{2\pi}\right)^2 K_R. \quad (7)$$

In the above equations, $\dot{\theta}_x$, x=s or 0, indicates a time derivative $d\theta_x/dt$ of $\theta_x$. Hereinafter, J defined by the equation (5) will be referred to as a subtotal inertia which contains the second inertia $J_0$ of the axis of the pinion 9, the third inertia $J_m$ of the shaft of the motor 6, and the mass $M_R$ of the rack 7, C defined by the equation (6) will be referred to as a subtotal friction coefficient which contains the second viscous friction coefficient $C_0$ of the axis of the pinion 9, and the third viscous friction coefficient $C_m$ of the motor 6, the fourth viscous friction coefficient $C_R$ of the rack 7, and K defined by the equation (7) will be referred to as a subtotal spring constant which contains the first spring constant $K_T$ of the torsion bar and the second spring constant $K_T$ of the rack 7.

The equation (1) represents an equation of motion of the steering wheel 3 when the steering wheel 3 is recognized as a rigid body having the first inertia $J_x$. The second term of the right hand side of the equation (1) expresses a viscous friction force that is generated during rotation of the steering wheel 3 to prevent the steering wheel 3 from rotating, that is, the viscous friction force is applied in the opposite direction to the rotation of the steering wheel 3. In general, the magnitude of the viscous friction force is proportional to velocity of the rigid body, while the magnitude of the Coulomb friction is constant which is independent of velocity of the rigid body. Hence, the fourth term of the right hand side of the equation (1) which represents the magnitude of the first Coulomb friction coefficient $F_{Cs}$ of the steering wheel 3 is independent of velocity $\dot{\theta}_s$ of the steering wheel 3.

The equation (2) represents an input-output relation of the steering torque sensor 4a. The rotary torque $T_{xn}$ is proportional to a difference between the steering angle $\theta_s$ of the steering wheel 3 and the second rotation angle $\theta_0$ of the axis of the pinion 9.

The equation (3) represents an equation of motion of the input shaft 5, the steering torque sensor 4a, and the pinion 9. The first term of the left hand side of the equation (3) represents a rotary torque applied from the motor 2 via the gear 6 to the pinion 9. The rotary torque $nK_{tr}i_a$ is proportional to the motor current $i_n$.

The equation (4) represents an input-output relation of the gear 6 showing a fact that rotation of the motor 2 is reduced by the gear 6 and then is transmitted to the pinion 9.

The default values of the physical parameters are experimentally determined.

In the equations (1) to (4),
the rotary torque $T_{sn}$,
the steering angle $\theta_s$ of the steering wheel 3,
the steering torque $T_s$,
the first rotation angle $\theta_m$ of the motor 2,
the second rotation angle $\theta_0$ of the axis of the pinion 9,
the motor current $i_a$,
and are called steering parameters. The parameter estimation section 120 receives the first to fifth signals indicating the steering parameters and estimates at least one of the physical parameters.

The steering parameters are not linearly independent because equation (4) shows that the first rotation angle $\theta_m$ of the motor 2 and the second rotation angle $\theta_0$ of the axis of the pinion 9 are not linearly independent. Hence, not all of the five input signals are necessary to perform estimation of the physical parameters.

In the present embodiment, an on-line recursive least square method is applied in the estimation of the physical parameters based on the steering parameters, $\theta_s$, $T_s$, $\theta_m$, $\theta_0$, and $i_a$.

In the estimation of the physical parameters by the parameter estimation section 120, it is allowed that the parameter estimation section 120 monitors and stores historical data of the physical parameters to be used for the estimation with an improved accuracy.

In the following, the on-line recursive least square method is simply described.

The on-line recursive least square method is one of the estimation methods for linear regression models. The linear regression models are generally expressed by an equation which is defined with a discrete time variable t:

$$y(t) = \theta^T(t)\phi(t), \quad (8)$$

where $\phi(t)$ is data vector at time moment t, $\theta(t)$ is an unknown parameter vector, and y(t) is an estimated vector at the next time moment t+1. The main object of the recursive feast square method is to estimate the unknown parameter vector $\theta(t)$.

In order to perform estimation of the unknown parameter vector $\theta(t)$, in the recursive least square method, a cost function $J(\theta)$ is minimized, where $$J(\vartheta) = \sum_{t=1}^{N} \kappa^{t-N}(y(t) - \vartheta^T(t)\varphi(t))^2, \quad (9)$$

and $\kappa$ is an exponential weighting factor which effectively limits the number of terms in the time sum in equation (9) based on which the cost function $J(\theta)$ is minimized.

The cost function $J(\theta)$ is minimized by taking partial derivatives of the cost function $J(\theta)$ and setting the results to zero. Thus, the following relations are obtained:

$$\theta(t) = \theta(t-1) + K(t)[y(t) - \phi^T(t)\theta(t-1)], \quad (10)$$

$$K(t) = \frac{P(t-1)\varphi(t)}{\kappa + \varphi^T(t)P(t-1)\varphi(t)}, \quad (11)$$

$$P(t) = \frac{1}{\kappa}\left(P(t-1) - \frac{P(t-1)\varphi^T(t)\varphi(t)P(t-1)}{\kappa + \varphi^T(t)P(t-1)\varphi(t)}\right), \quad (12)$$

where P(t) is defined by $$\left(\sum_{t=1}^{N} \varphi(t)\varphi^T(t)\right).$$

In the on-line recursive least square method, the equation (1) can be read as follows:

$$y(t) = T_s - T_{xn}, \quad (13)$$

$$\phi(t) = [\ddot{\theta}_N, \dot{\theta}_N]^T, \quad (14)$$

$$\theta(t) = [J_s, C_s]^T. \quad (15)$$

Using equations (13) to (15) in the on-line recursive least square method, the first inertia $J_s$, and the first viscous friction coefficient $C_s$ of the steering wheel 3 can be estimated based on the steering torque $T_x$ applied by the operator to the steering wheel 3 and the rotary torque $T_{xn}$ determined by the steering torque sensor 4a when the steering angle $\theta_s$ of the steering wheel 3 and its time derivatives are obtained.

The equation (2) can be read in the context of the on-line recursive least square method as follows:

$$y(t)=T_{xn}, \quad (16)$$

$$\phi(t)=\theta_s-\theta_0. \quad (17)$$

Thus, it is possible to estimate a value of the first spring constant $K_T$ of the torsion bar based on the rotary torque $T_{xn}$ when the steering angle $\theta_s$ of the steering wheel 3 and the second rotation angle $\theta_0$ of the axis of the pinion 9 are obtained.

The equation (3) can be read in the context of the on-line recursive least square method as follows:

$$y(t)=K_T\theta_s+nK_{tr}i_a, \quad (18)$$

$$\phi(t)=[\ddot{\theta}_0,\dot{\theta}_0,\theta_0]^T, \quad (19)$$

$$\theta(t)=[J,C,K]^T. \quad (20)$$

Hence, it is possible to estimate values of J, C, and K which are defined by the equations (5) to (7).

In the above discussion, the on-line recursive least square method is applied to estimate the physical parameters which are changed from the default values thereof due to the component deterioration with age. These changes in values of the physical parameters lead to a deterioration of the steering feeling of the operator.

When the changes in the values of the physical parameters from the default values are estimated, those changes can be compensated by adjusting the motor current $i_a$ to a target value which is determined so as to compensate for the changes in the values of the physical parameters. However, it is needed for the operator to operate the steering wheel 3 for using the on-line recursive least square method under one of situations:

(i) when the vehicle providing the electric power steering system 1 is undergoing a routine maintenance, a maintenance engineer manually operates the steering wheel 3 or some tool such as an electric motor is used to automatically operate the steering wheel 3, (ii) when the vehicle is not running, for example, the vehicle is parked, the operator of the vehicle manually operates the steering wheel 3 or some tool such as an electric motor is used to automatically operate the steering wheel 3, or (iii) when the vehicle is traveling, the operator operates the steering wheel 3 to change the direction of travel of the vehicle.

In the present embodiment, the parameter estimation section 120 of the controller 100 performs the estimation of the physical parameters under the situation (iii) mentioned above. That is, the controller 100 can obtain the precise current values of the physical parameters. However, in order to accurately estimate the physical parameters using the on-line recursive least square method, the condition should be satisfied. In the present embodiment, the condition states that the steering wheel 3 is operated in a manner where the differential value $\dot{\theta}_s$ of the steering angle $\theta_s$ is constant for a predetermined time period. Such operation of the steering wheel 3 is not a rare even during the operator operating the vehicle to travel, and satisfaction of the condition can be automatically detected. If accuracy of the estimation can be sacrificed, the condition can be removed.

The on-line recursive least square method for estimating the physical parameters of the electric power steering system 1 is defined by the parameter estimation program stored in the memory.

The gain control section 130 determines the gain $K_2$ of the second amplifier 113 referring to relationships between the gain $K_2$ and the default values of the physical parameters. The relationship is stored in the memory as an assist map (table). The default values of the physical parameters have been predetermined to obtain the optimum steering feeling of the operator. Hence, when the changes in the values of the physical parameters from the default values can be obtained by the parameter estimation section 120, a target value of the gain $K_2$ that compensate for the changes in the values of the physical parameters can be determined by the gain control section 130. The gain control section 130 is configured to output a gain control signal indicating the gain $K_2$ to the second amplifier 113.

When the second amplifier 113 receives the gain control signal to update the value of the gain $K_2$, the second amplifier signal is also updated, and the PID controller 114 computes the updated target value $T_{snref}$ of the output torque of the motor 2 based on the sum $K_1\theta_s+K_2\theta_s$, and outputs the updated motor current $i_n$.

Figure 3:
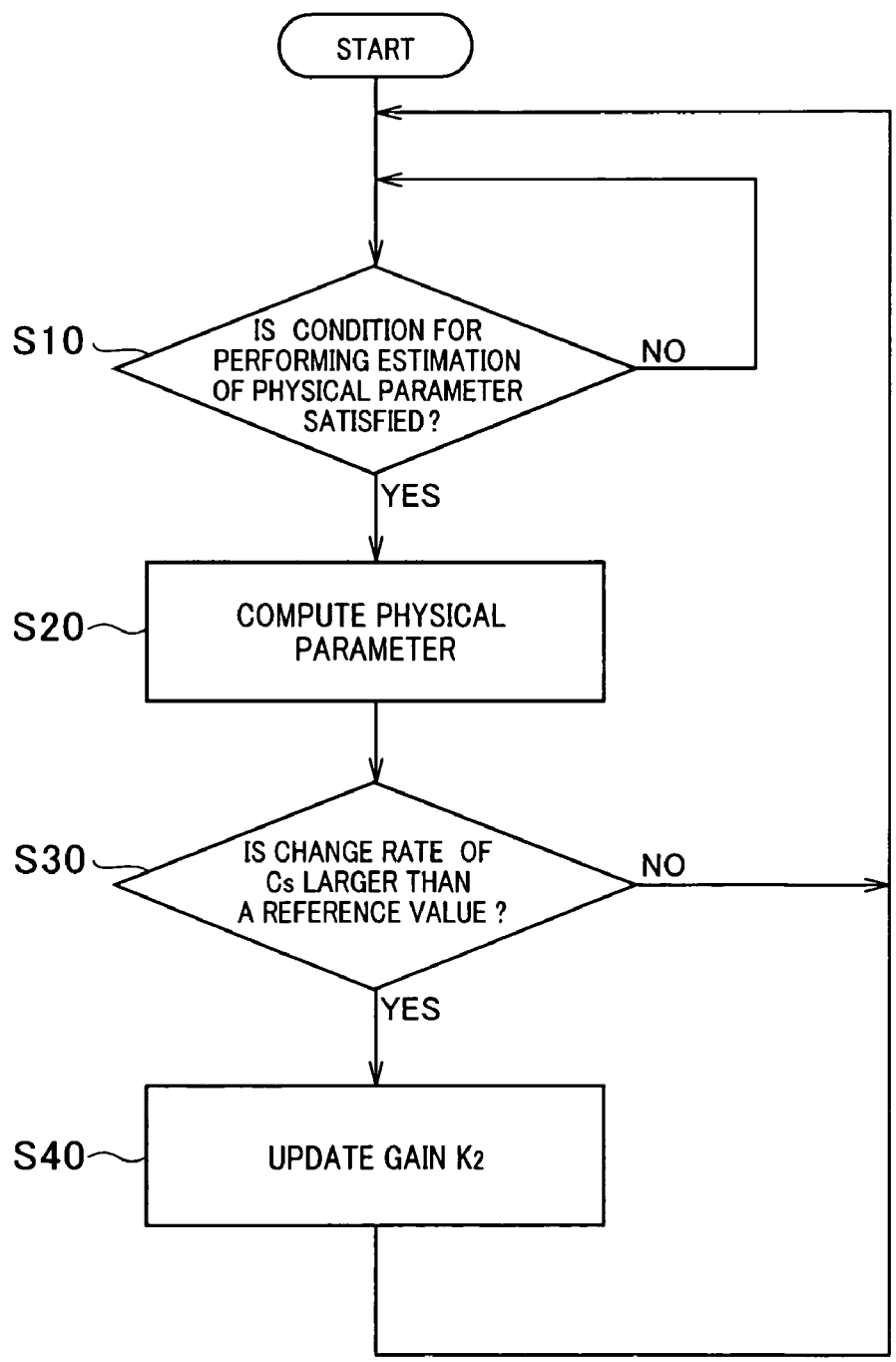
FIG. 3 is a flow chart for explaining a processing operation to be performed repeatedly in a predetermined control cycle by a controller of the electric power steering system for determining an assist torque applied from a motor to an axis of pinion so as to assist steering operation of operator.
Figure 4A:
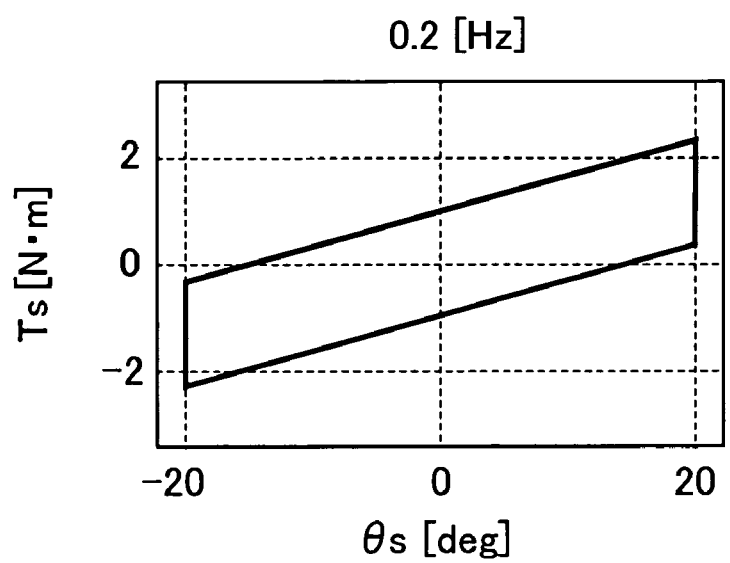
FIGS. 4A to 4D are Lissajous' figures for showing a relationship between rotation angle of a steering wheel and steering torque applied by an operator of a vehicle, wherein changes in the steering torque are formed as sinusoidal waves over time and frequencies of the sinusoidal waves are 0.2 Hz, 0.5 Hz, 1.0 Hz, and 1.8 Hz, respectively.
Figure 4B:
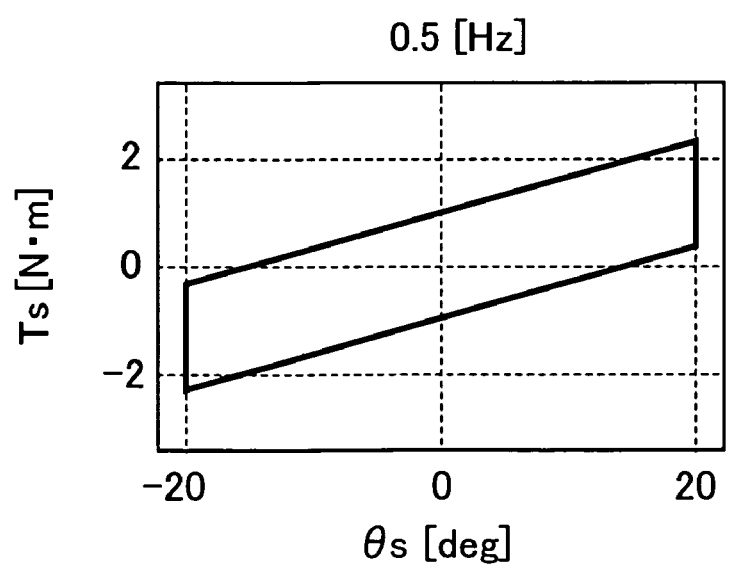
Figure 4C:
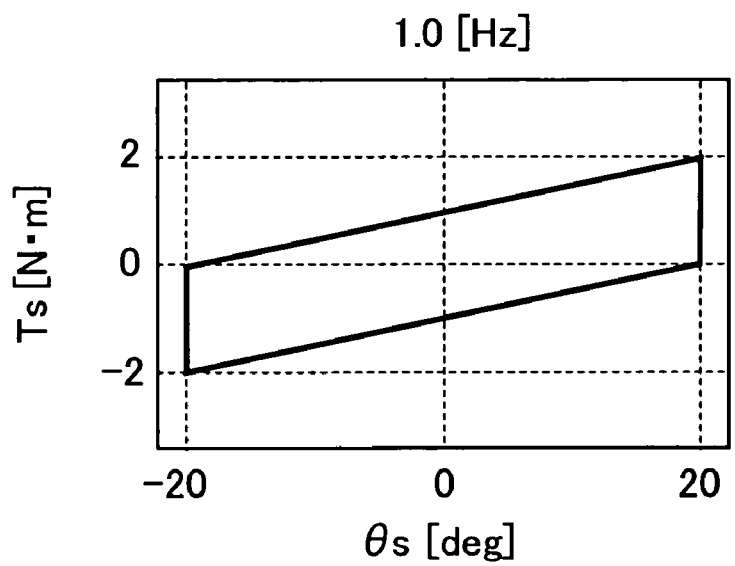
Figure 4D:
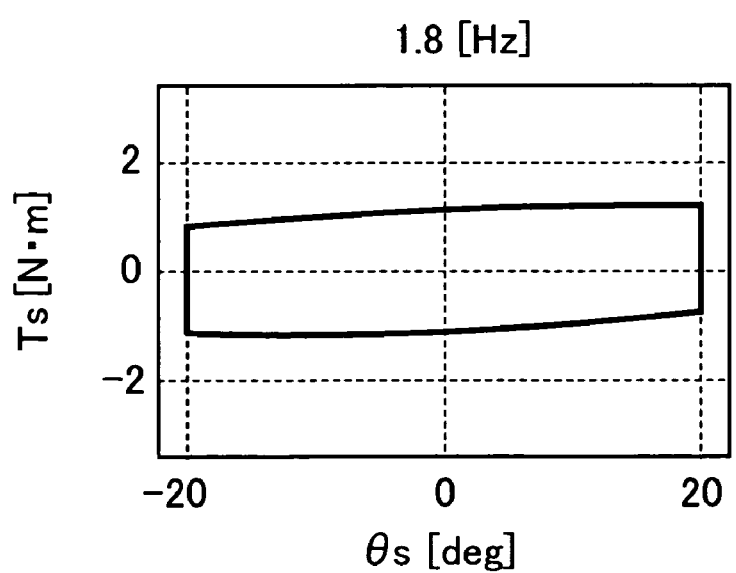

FIG. 3 is a flow chart for explaining a processing operation to be performed repeatedly in a predetermined control cycle by the controller 100 of the electric power steering system 1 for determining the target value $T_{snref}$ of the output torque of the motor 2.

In step S10, the parameter estimation section 120 determines whether or not the condition is satisfied to perform the estimation of the physical parameter, wherein the condition indicates that the steering wheel 3 is operated in a manner where the differential value $\dot{\theta}_s$ of the steering angle $\theta_s$ is constant for a predetermined time period. If the result of the determination in the step S10 is "NO" that is, the condition is not satisfied, the procedure repeatedly performs the determination in the step S10 until the result of the determination becomes "YES". If the result of the determination in the step S10 is "YES", that is, the condition is satisfied, the procedure proceeds to the step S20.

In the step S20, the parameter estimation section 120 estimates at least one of the physical parameters such as the first viscous friction coefficient $Q_s$ of the steering wheel 3, and the like based on the five steering parameters, the rotary torque $T_{xn}$, the steering angle $\theta_d$ of the steering wheel 3, the steering torque $T_s$, the first rotation angle $\theta_m$ of the motor 2, the second rotation angle $\theta_0$ of the axis of the pinion 9, and the motor current $i_a$ using the on-line recursive least square method discussed above. During applying the on-line recursive least square method, the equations (1) to (d7) are assumed as the equations of motions of the electric power steering system 1. The procedure proceeds to step S30.

In the step S30, the gain control section 130 computes a change rate which is computed by dividing a change in one of the physical parameters by an original value of the one of the physical parameters obtained in the processing operation performed in the previous control cycle, where the one of the physical parameters has the most important effect on the steering feeling of the operator, for example, the first viscous friction coefficient $C_N$ of the steering wheel 3 in the present embodiment.

Further, in the step S30, the gain control section 130 determines whether or not the change rate of the particular physical parameters is larger then a predetermined reference value. If the determination in the step S30 is "YES", that is, the change rate of the one of the physical parameters is larger than the predetermined reference value, the procedure proceeds to the step S40. In contrast to this, if the determination in the step S30 is "NO", that is, the change rate of the one of the physical parameters is not larger than the predetermined reference value, the procedure jumps to the step S10 in which it is decided whether or not the condition is satisfied to perform the estimation of the physical parameter.

It is allowed that instead of determining whether or not the change rate of the particular physical parameters is larger then a predetermined reference value, an absolute value of the change in the particular physical parameters is compared with a reference value.

In the step S40, the gain control section 130 updates the gain $K_2$ referring to the assist map in which the relationships between the gain $K_2$ and the default values of the physical parameters are included.

As discussed above, the controller 100 according to the present embodiment refers to the equations of motions (1) to (7) which constitute a mathematical model of the electric power steering system 1. The equations of motions (1) to (7) expresses consistency relations in which, for example, a non-zero value of one of the steering parameters such as the steering angle $\theta_s$ determined by the steering wheel angle sensor 4b results in limitations on another of the steering parameters such as the motor current $i_a$ which is applied to the motor 2 via, for example, the equation of motion (3).

The steering parameters are determined by sensors installed in the electric power steering system 1, for example, the steering torque sensor 4a determining the rotary torque $T_{xn}$ applied to the steering shaft 8, the steering wheel angle sensor 4b detecting a steering angle $\theta_s$ of the steering wheel 3, and the like.

The parameter estimation section 120 of the controller 100 recursively estimates the physical parameters using the on-line recursive least square method based on the steering parameters. Further, the gain control section 130 computes differences between the current values of the physical parameters and the default ones and determines the gain $K_2$ of the second amplifier 113 referring to relationships between the gain $K_2$ and the default values of the physical parameters to outputs After the gain $K_2$ has been updated, the PID controller 114 computes the updated target value $T_{snref}$ of the output torque of the motor 2 based on the updated sum $K_1\dot{\theta}_s + K_2\theta_s$, and outputs the updated motor current $i_a$ to compensate for the changes in the values of the physical parameters due to the component deterioration with age on the constituents of the electric power steering system 1. Hence, even if the long use of the electric power steering system 1 cause the deteriorations of the constituents thereof, the optimum steering feeling of the operator which is set before the vehicle has been delivered can be maintained.

(Operations and Advantages of the Control Apparatus)

Referring to FIGS. 4A to 11D, the operations and advantages of the controller 100 and method for the electric power steering system 1 that transmits mechanical power from the motor 6 to the steering system of the vehicle to reduce the required steering torque $T_{sn}$ will be explained.

In the following, the parameter estimation section 120 of the controller 100 recursively estimates the physical parameters using the on-line recursive least square method based on the steering parameter referring to the equations of motions (1) to (7), and the gain control section 130 computes differences between the current values of the physical parameters and the default ones and determines the gain $K_2$ of the second amplifier 113 when the controller 100 is mounted in an indoor vehicle. Initial values of the physical parameters are adjusted to the default values from which the optimum steering feeling can be obtained.

FIGS. 4A to 4D are Lissajous' figures for showing a relationship between the rotation angle $\theta_s$ of the steering wheel 3 and the steering torque $T_s$ applied by the operator of the vehicle, when changes in the steering torque applied by the operator over time have sinusoidal wave forms and frequencies of the sinusoidal waves are 0.2 Hz, 0.5 Hz, 1.0 Hz, and 1.8 Hz, respectively.

The Lissajous' figure is widely known to be used to estimate the steering feeling qualitatively. In FIGS. 4A to 4D, neither inversion of phases nor oscillation of a line can be seen. This means that the steering feeling of the operator is comfortable.

Next, it is assumed that the operator operates the steering wheel 3 in the manner where the differential value $\dot{\theta}_x$ of the steering angle $\theta_s$ is constant for a predetermined time period and then the steering angle $\theta_s$ is kept to a constant value. In this situation, the controller 100 estimates the physical parameters using the on-line recursive least square method based on the steering angle $\theta_s$ and the steering torque $T_s$ applied by the operator referring to the equations of motions (1) to (7).

Figure 5A:
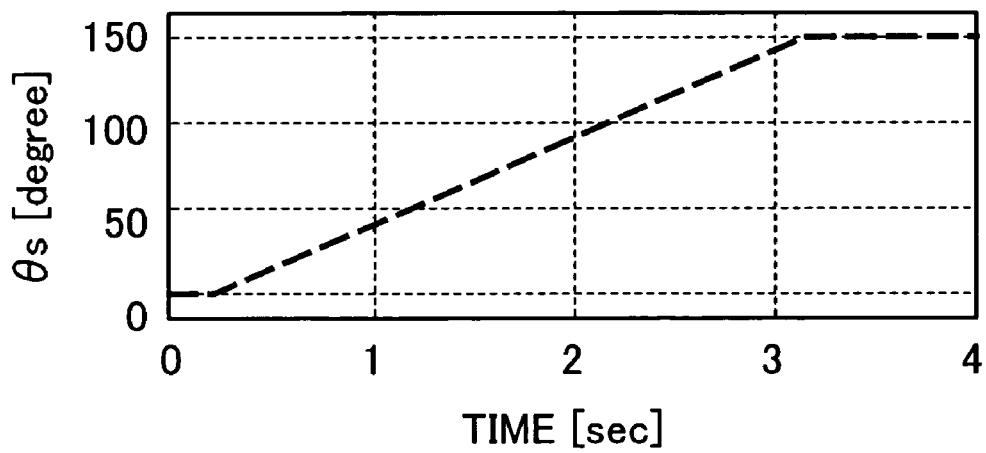
FIG. 5A is a graph for showing a change in the rotation angle of the steering wheel which is one of steering parameters capable of being determined by the operator over time.

FIG. 5A is a graph for showing a change in the rotation angle $\theta_s$ of the steering wheel 3 over time.

Figure 5B:
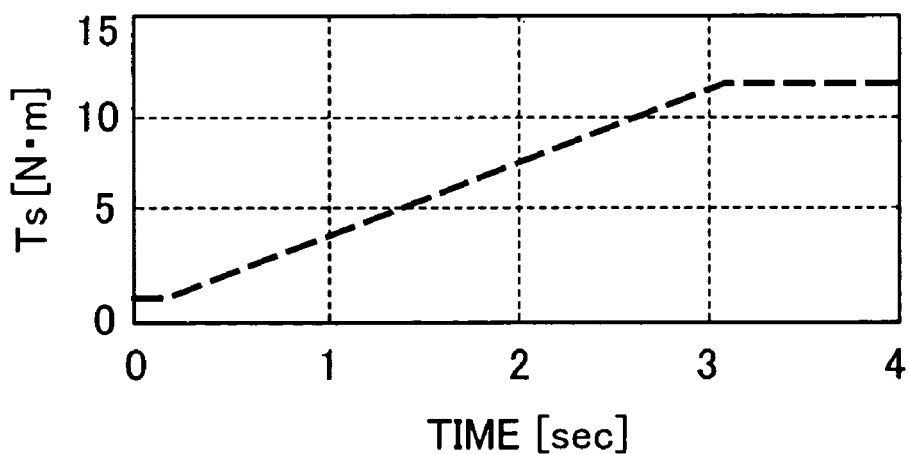
FIG. 5B is a graph for showing a change in the steering torque applied by the operator of the vehicle over time.

FIG. 5B is a graph for showing a change in the steering torque $T_s$ applied by the operator of the vehicle over time.

Results of the estimation of the physical parameters using the on-line recursive least square method can be seen in FIGS. 6A to 6F.

Figure 6A:
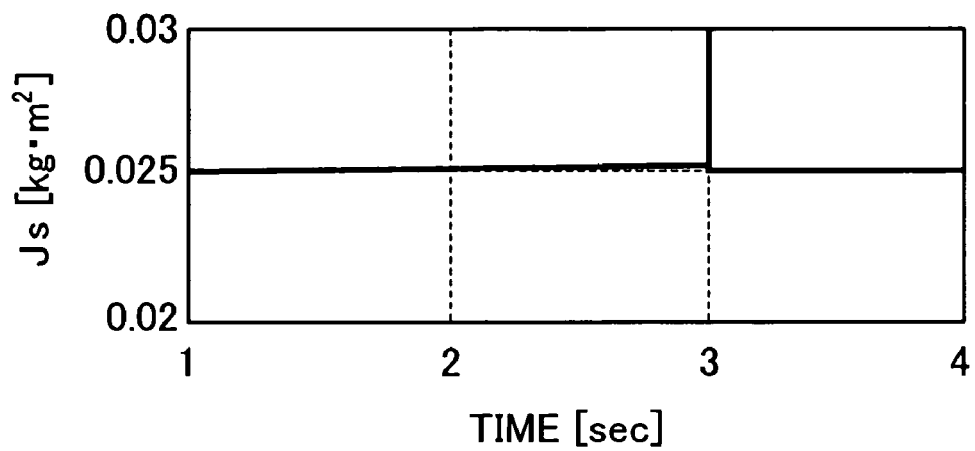
FIG. 6A is a graph for showing a change in an estimated value (solid line) and a true value (dashed line) of a first inertia of the steering wheel over time.

FIG. 6A is a graph for showing a change in an estimated value (solid line) and a true value (dashed line) of the first inertia $J_s$ of the steering wheel 3 over time.

Figure 6B:
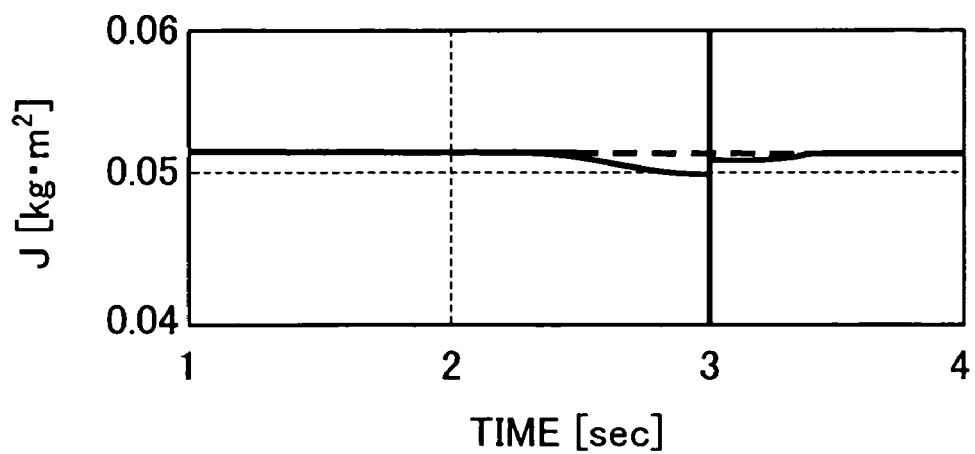
FIG. 6B is a graph for showing a change in an estimated value (solid line) and a true value (dashed line) of a subtotal inertia of the electric power steering system over time.

FIG. 6B is a graph for showing a change in an estimated value (solid line) and a true value (dashed line) of the subtotal inertia J of the electric power steering system 1 over time.

Figure 6C:
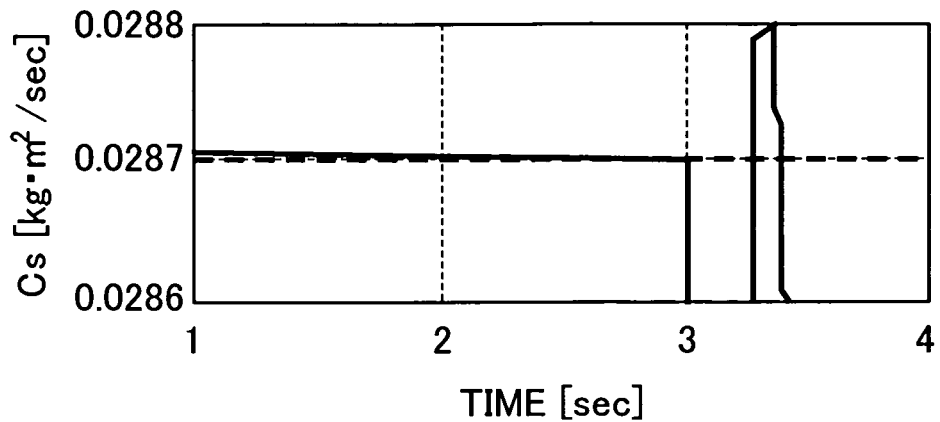
FIG. 6C is a graph for showing a change in an estimated value (solid line) and a true value (dashed line) of a first viscous friction coefficient of the steering wheel over time.

FIG. 6C is a graph for showing a change in an estimated value (solid line) and a true value (dashed line) of the first viscous friction coefficient $C_s$ of the steering wheel 3 over time.

Figure 6D:
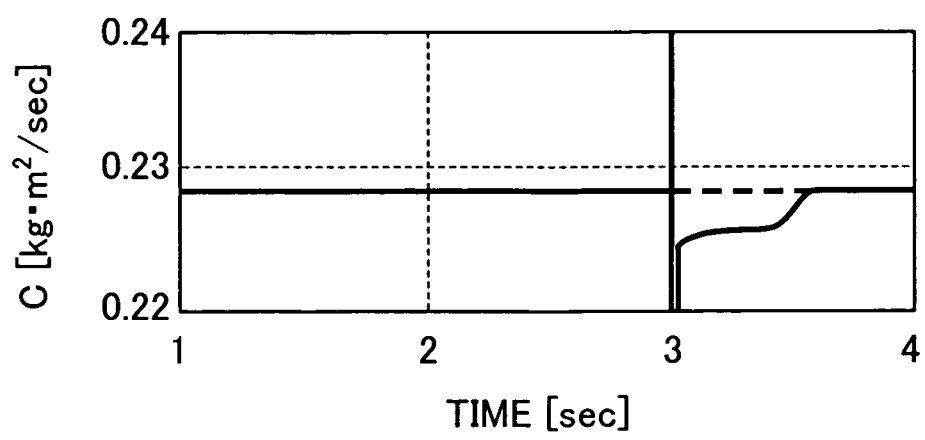
FIG. 6D is a graph for showing a change in an estimated value (solid line) and a true value (dashed line) of a subtotal friction coefficient of the electric power steering system over time.

FIG. 6D is a graph for showing a change in an estimated value (solid line) and a true value (dashed line) of the subtotal friction coefficient C of the electric power steering system 1 over time.

Figure 6E:
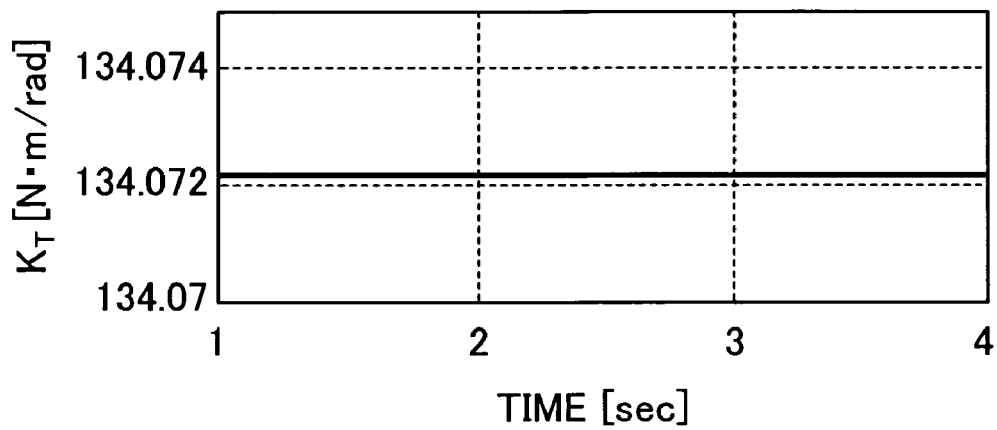
FIG. 6E is a graph for showing a change in an estimated value (solid line) and a true value (dashed line) of a first spring constant of a torsion bar of a torque sensor over time.

FIG. 6E is a graph for showing a change in an estimated value (solid line) and a true value (dashed line) of the first spring constant $K_T$ of a torsion bar of a torque sensor 4a over time.

Figure 6F:
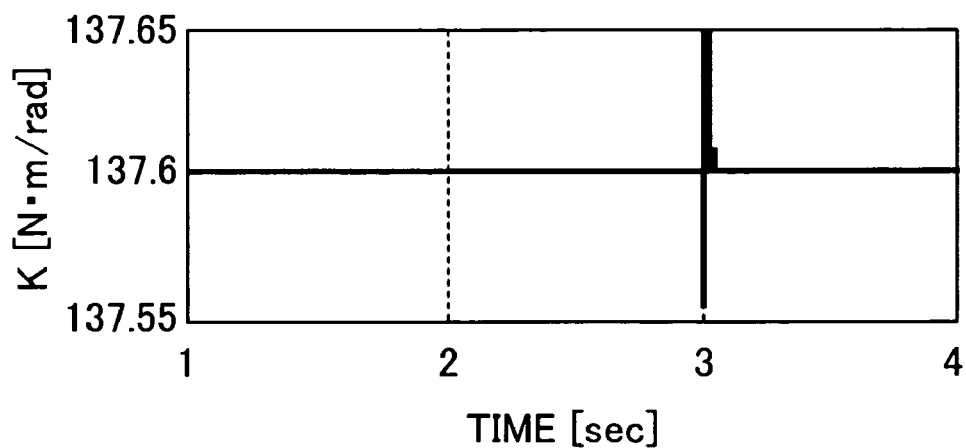
FIG. 6F is a graph for showing a change in an estimated value (solid line) and a true value (dashed line) of a subtotal spring constant of the electric power steering system over time.
Figure 7A:
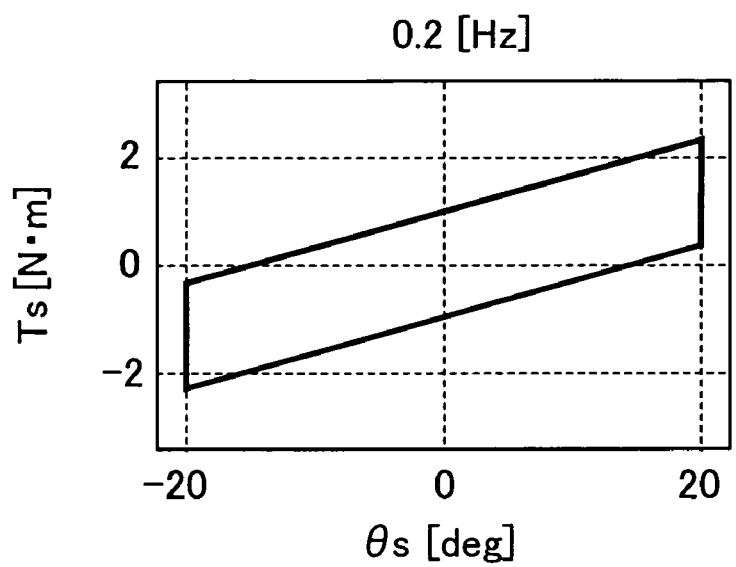
FIGS. 7A to 7D are Lissajous' figures for showing a relationship between a rotation angle of a steering wheel and a steering torque applied by the operator, wherein the first viscous friction coefficient of the steering wheel is increased by 900 percent due to the component deterioration with age caused by the long use of the electric power steering system, and the changes in the steering torque are formed as sinusoidal waves over time and frequencies of the sinusoidal waves are 0.2 Hz, 0.5 Hz, 1.0 Hz, and 1.8 Hz, respectively.
Figure 7B:
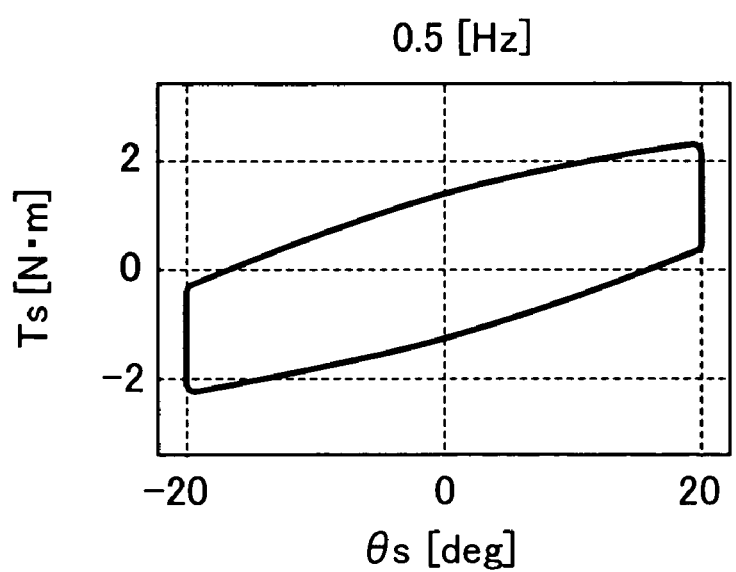
Figure 7C:
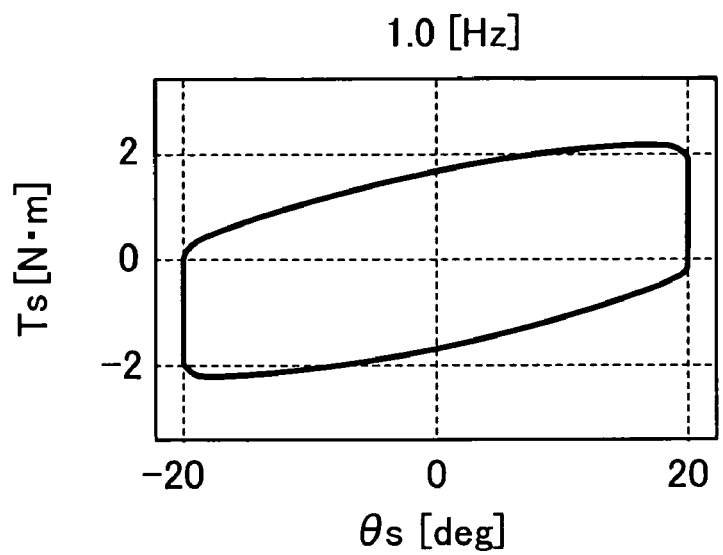
Figure 7D:
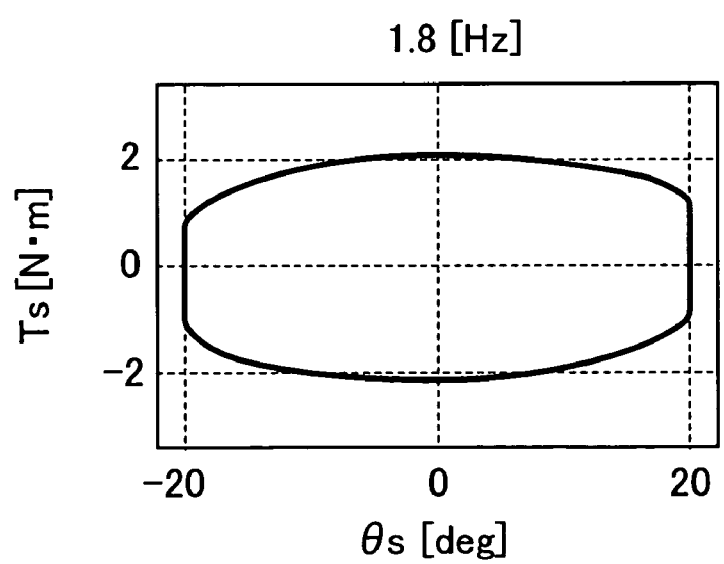

FIG. 6F is a graph for showing a change in an estimated value (solid line) and a true value (dashed line) of the subtotal spring constant K over time.

In all of FIGS. 6A to 6F, the estimated values and the true values agree well in a time period during which the differential value $\dot{\theta}_s$ of the steering angle $\theta_s$ is constant. Hence, the estimation of the physical parameters of the electric power steering system 1 can be performed by the controller 100, and the method for performing the estimation has been verified.

Next, it is assumed that the first viscous friction coefficient $C_d$ of the steering wheel 3 is increased by 900 percent due to the component deterioration with age caused by the long use of the steering system 1

FIGS. 7A to 7D are Lissajous' figures in this case for showing a relationship between the rotation angle $\theta_s$ of the steering wheel 3 and the steering torque $T_s$ applied by the operator of the vehicle, when the changes in the steering torque are formed as sinusoidal waves over time and frequencies of the sinusoidal waves are 0.2 Hz, 0.5 Hz, 1.0 Hz, and 1.8 Hz, respectively.

Comparing to FIGS. 4A to 4D, all of the Lissajous' figures shown in FIGS. 7A to 7D are rounded to indicate that the steering feeling of the operator is deteriorated.

The estimation of the physical parameters is performed using the on-line recursive least square method based on the steering angle $\theta_s$ and the steering torque $T_s$ applied by the operator referring to the equations of motions (1) to (7) when the first viscous friction coefficient $C_s$ of the steering wheel 3 is increased by 900 percent.

The steering operation of the operator is expressed in FIGS. 5A and 5B. That is, the operator operates the steering wheel 3 in the manner where the differential value $\dot{\theta}_d$ of the steering angle $\theta_s$ is constant for a predetermined time period and then the steering angle $\theta_s$ is kept to a constant value.

Figure 8A:
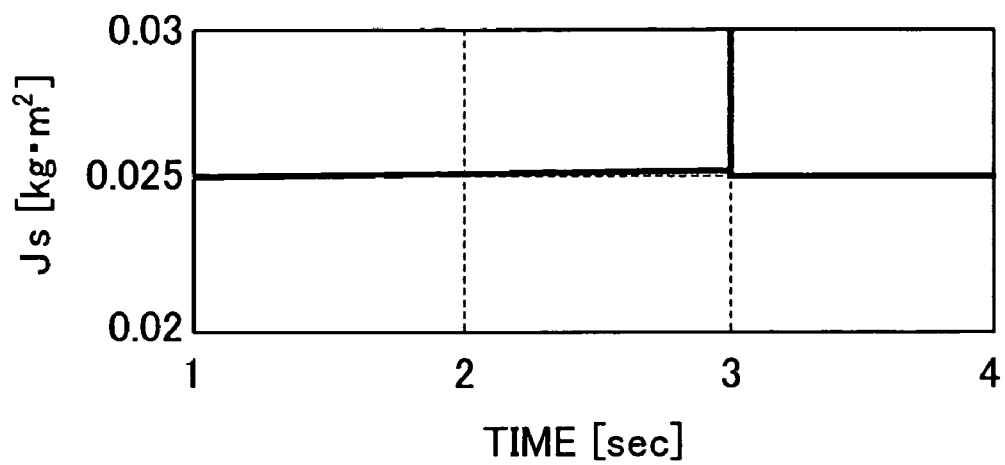
FIG. 8A is a graph for showing a change in an estimated value (solid line) and a true value (dashed line) of a first inertia of the steering wheel over time when it is assumed that the first viscous friction coefficient of the steering wheel is increased by 900 percent due to the component deterioration with age caused by the long use of the electric power steering system.

FIG. 8A is a graph for showing a change in an estimated value (solid line) and a true value (dashed line) of the first inertia $J_s$ of the steering wheel 3 over time when the first viscous friction coefficient $C_s$ of the steering wheel 3 is increased by 900 percent.

Figure 8B:
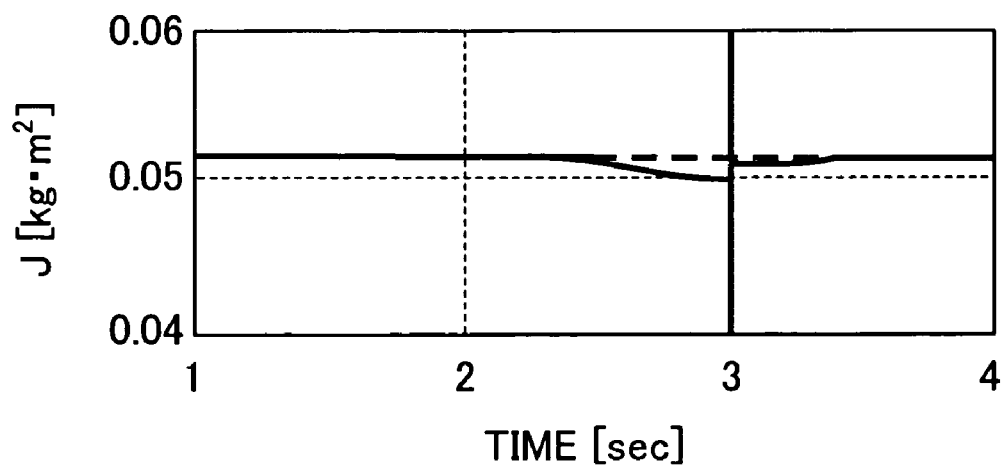
FIG. 8B is a graph for showing a change in an estimated value (solid line) and a true value (dashed line) of a subtotal inertia of the electric power steering system over time when it is assumed that the first viscous friction coefficient of the steering wheel is increased by 900 percent.

FIG. 8B is a graph for showing a change in an estimated value (solid line) and a true value (dashed line) of a subtotal inertia J of the electric power steering system 1 over time when the first viscous friction coefficient $C_s$ of the steering wheel 3 is increased by 900 percent.

Figure 8C:
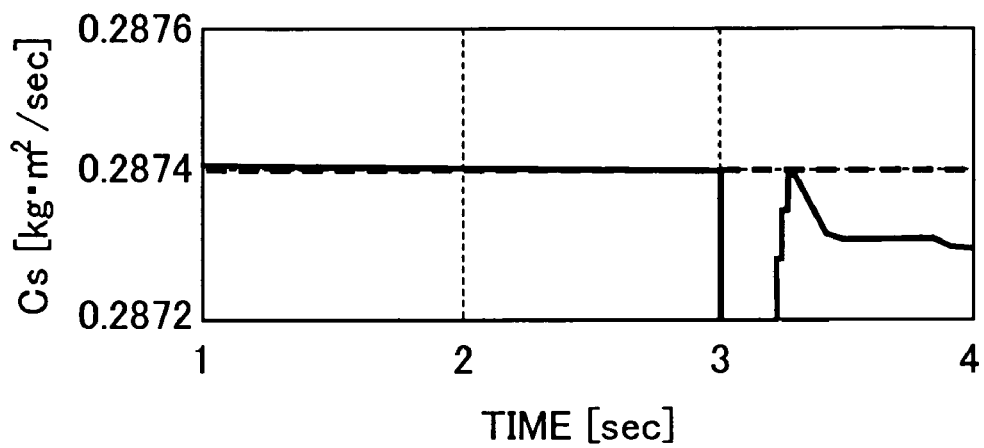
FIG. 8C is a graph for showing a change in an estimated value (solid line) and a true value (dashed line) of a first viscous friction coefficient of the steering wheel over time when it is assumed that the first viscous friction coefficient of the steering wheel is Increased by 900 percent.
Figure 8D:
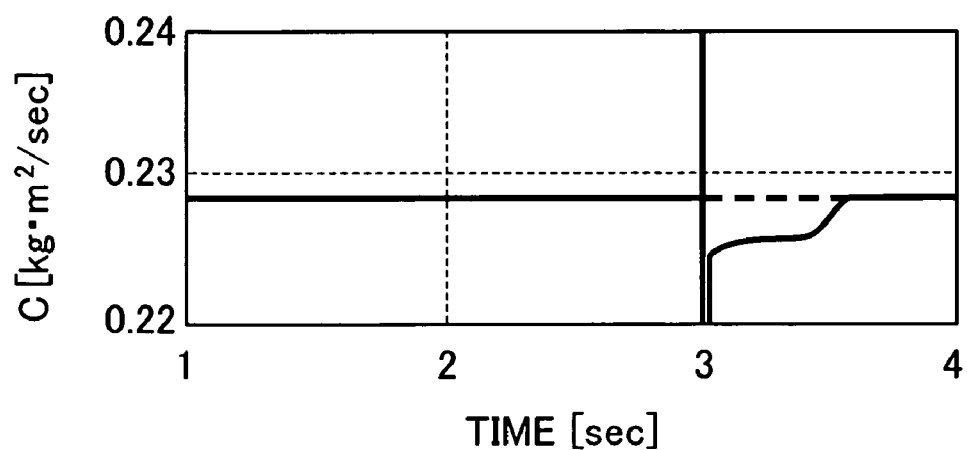
FIG. 8D is a graph for showing a change in an estimated value (solid line) and a true value (dashed line) of a subtotal friction coefficient of the electric power steering system over time when it is assumed that the first viscous friction coefficient of the steering wheel is increased by 900 percent.

FIG. 8C is a graph for showing a change in an estimated value (solid line) and a true value (dashed line) of the first viscous friction coefficient $C_s$ of the steering wheel 3 over time when the first viscous friction coefficient $C_s$ of the steering wheel 3 is increased by 900 percent.

FIG. 5D is a graph for showing a change in an estimated value (solid line) and a true value (dashed line) of the subtotal friction coefficient C of the electric power steering system 1 over time when the first viscous friction coefficient $C_s$ of the steering wheel 3 is increased by 900 percent.

Figure 8E:
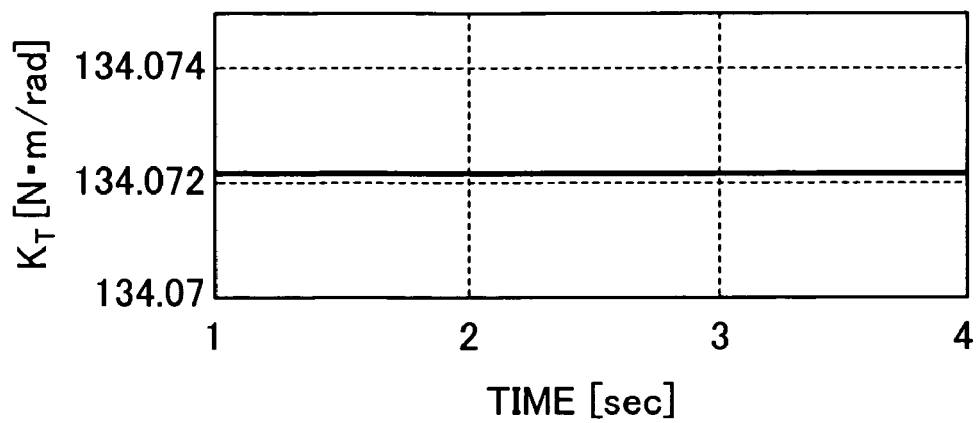
FIG. 8E is a graph for showing a change in an estimated value (solid line) and a true value (dashed line) of a first spring constant of a torsion bar of a torque sensor over time when it is assumed that the first viscous friction coefficient of the steering wheel is increased by 900 percent.
Figure 8F:
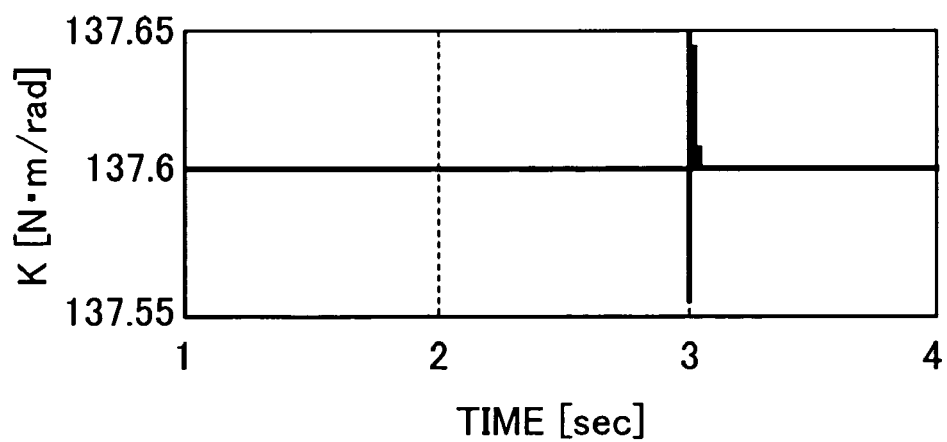
FIG. 8F is a graph for showing a change in an estimated value (solid line) and a true value (dashed line) of a subtotal spring constant of the electric power steering system over time when it is assumed that the first viscous friction coefficient of the steering wheel is increased by 900 percent.
Figure 9A:
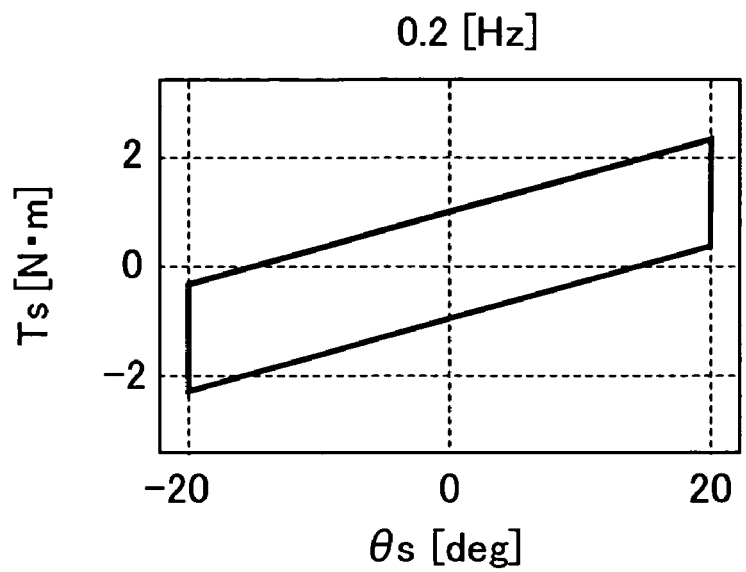
FIGS. 9A to 9D are Lissajous' figures obtained by a controller having an updated value of a gain a second amplifier for showing a relationship between the rotation angle of the steering wheel and the steering torque applied by the operator, the changes in the steering torque are formed as sinusoidal waves over time and frequencies of the sinusoidal waves are 0.2 Hz, 0.5 Hz, 1.0 Hz, and 1.8 Hz, respectively.
Figure 9B:
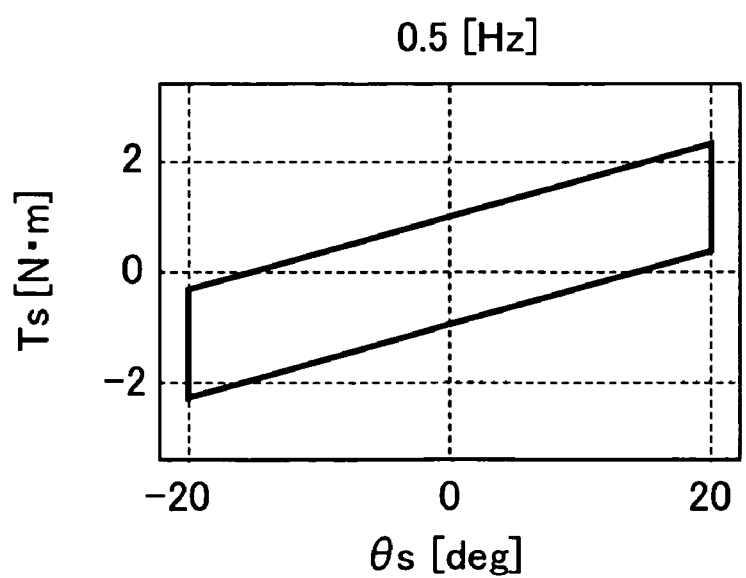
Figure 9C:
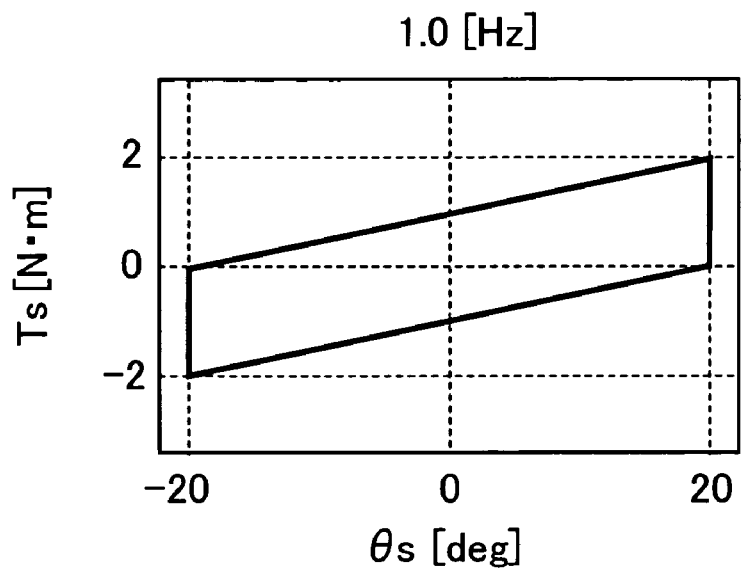
Figure 9D:
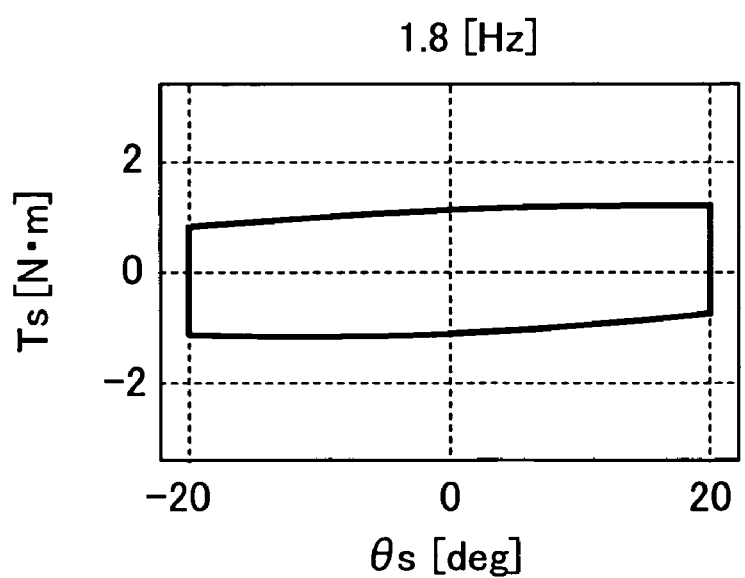

FIG. 8E is a graph for showing a change in an estimated value (solid line) and a true value (dashed line) of the first spring constant $K_T$ of a torsion bar of a torque sensor 4a over time when the first viscous friction coefficient $C_s$ of the steering wheel 3 is increased by 900 percent.

FIG. 5F is a graph for showing a change in an estimated value (solid line) and a true value (dashed line) of the subtotal spring constant K over time when the first viscous friction coefficient $C_s$ of the steering wheel 3 is increased by 900 percent.

As shown in FIG. 8C, the estimated value of the first viscous friction coefficient $C_s$ of the steering wheel 3 is increased by 900 percent in comparison with a case shown in FIG. 6C. This means that the first viscous friction coefficient $C_s$ of the steering wheel 3 is one of important factors influencing on the steering feeling of the operator.

In all of FIGS. 8A to 8F, the estimated values and the true values agreed well in a time period during which the differential value $\dot{\theta}_s$ of the steering angle $\theta_s$ is constant. Hence, the estimation of the physical parameters of the electric power steering system 1 can be performed by the controller 100, and the method for performing the estimation has been verified even when the first viscous friction coefficient $C_s$ of the steering wheel 3 varies widely from the default value thereof.

Next, the gain $K_2$ of the second amplifier 113 has been updated in response to a change in the first viscous friction coefficient $C_d$ by the parameter estimation section 120, the updated value of the gain $K_2$ is stored in the second amplifier 113. When the controller 100 including the updated value of the gain $K_2$ is used to obtain Lissajous' figures in this case for showing a relationship between the rotation angle $\theta_s$ of the steering wheel 3 and the steering torque $T_s$ applied by the operator of the vehicle, as shown in FIGS. 9A to 9D.

FIGS. 9A to 9D are Lissajous' figures obtained by a controller 100 having the updated value of the gain $K_2$ of the second amplifier 113 for showing a relationship between the rotation angle $\theta_s$ of the steering wheel 3 and the steering torque $T_s$ applied by the operator of the vehicle, the changes in the steering torque are formed as sinusoidal waves over time and frequencies of the sinusoidal waves are 0.2 Hz, 0.5 Hz, 1.0 Hz, and 1.8 Hz, respectively.

The Lissajous' figures shown in FIGS. 9A to 9D have been remedied to have similar shapes to those shown in FIGS. 7A to 7D.

Hence, the controller 100 has been estimated the physical parameters using the on-line recursive least square method based on the steering parameter referring to the equations of motions (1) to (7), and has been computed the differences between the current values of the physical parameters and the default ones to determine the gain $K_2$ of the second amplifier 113. It is obvious that the operation of the controller 100 has a function of maintaining the steering feeling of the operator which is adjusted to the optimum one before the vehicle providing with the electric power steering system 1 including the controller 100 is delivered from the vendor.

Modification of the Embodiment

While the present invention has been disclosed in terms of the preferred embodiment in order to facilitate a better understanding thereof, it should be appreciated that the invention can be embodied in various ways without departing from the principle of the invention.

For example, it is allowed that the estimation of the physical parameters is performed using only the equation of motion (1). The equation of motion (1) includes the first inertia $J_s$ and the first viscous friction coefficient $C_s$ of the steering wheel 3 as the physical parameters of the electric power steering system 1. Hence, changes in the first inertia $J_s$ and the first viscous friction coefficient $C_s$ of the steering wheel 3 can be estimated by applying the equation of motion (1) to the on-line recursive least square method, and these changes would be compensated by varying at least one of the gains $K_1$, $K_2$ of the first and second amplifier 112, 113.

Further, in the embodiment disclosed above, the on-line recursive least square method is used to estimate the physical parameters of the electric power steering system such as the first viscous friction coefficient $C_d$ of the steering wheel 3. However, it is allowed that instead of the on-line recursive least square method, the Kalman filter can be used.

In the above embodiment, as shown in FIG. 3, if the determination in step S30 is "YES", the gain control section 130 updates the gain $K_2$ referring to the assist map in the step S40. However, it is allowed that irrespective to the determination in step S30, the gain control section 130 updates the gain $K_2$. In this case, it is preferable that if determination in step S30 is "YES", operation for updating of the gain $K_2$ is performed without any time delay, and if determination in step S30 is "YES", operation for updating of the gain $K_2$ is performed with some time delay, for example, during next stop of the vehicle due to indication of a traffic signal on the traveling road.

What is claimed is:

1. A control apparatus that controls a motor of an electric power steering system to assist a steering effort of an operator, comprising:
   a sensor configured to detect a current value of a steering parameter expressing a condition of a steering operation of the operator;
   a parameter computer configured to:
      store therein a mathematic model expressing, as a plurality of equations, at least a part of the electric power steering system based on the steering parameter and a plurality of physical parameters that express a physical characteristic of the electric power steering system; and
      compute, using an online identification method, a current value of at least one of the plurality of physical parameters based on the mathematic model and the current value of the steering parameter;
   a target torque computer configured to:
      store therein a relationship between change in the at least one of the plurality of physical parameters and a gain for returning a current steering feeling of the operator to a preset steering feeling;
      determine a value of the gain based on the relationship and a difference between the current value of the at least one of the plurality of physical parameters and a default value; and
      compute, based on the determined value of the gain, a target torque of the motor which compensates for the difference between the current value and the default value of the at least one of the plurality of physical parameters; and
   a motor driver configured to drive the motor to generate the target torque so that the steering feeling of the operator is maintained at the preset steering feeling.

2. The control apparatus according to claim 1, wherein the online identification method is an on-line recursive least square method.

3. The control apparatus according to claim 1, wherein the mathematic model includes a friction coefficient as the at least one of the plurality of physical parameters.

4. A method for controlling a motor of an electric power steering system to assist a steering effort of an operator, comprising:
   detecting a current value of a steering parameter expressing a condition of a steering operation of the operator;
   storing a mathematic model expressing, as a plurality of equations, at least a part of the electric power steering system based on the steering parameter and a plurality of physical parameters that express a physical characteristic of the electric power steering system; and
   computing, using an online identification method, a current value of at least one of the plurality of physical parameters based on the mathematic model and the current value of the steering parameter;
   storing a relationship between change in the at least one of the plurality of physical parameters and a gain for returning a current steering feeling of the operator to a preset steering feeling;
   determining a value of the gain based on the relationship and a difference between the current value of the at least one of the plurality of physical parameters and a default value;
   computing, based on the determined value of the gain, a target torque of the motor which compensates for the difference between the current value and the default value of the at least one of the plurality of physical parameters; and
   driving the motor to generate the target torque so that the steering feeling of the operator is maintained at the preset steering feeling.

5. The control method according to claim 4, wherein the mathematic model includes a friction coefficient as the at least one of the plurality of physical parameters.

6. The control method according to claim 4, wherein the steering system includes a steering wheel, an axis of a pinion, a rack, a torsion bar, and a gear, and the plurality of equations of the mathematic model are:

$$T_s = J_s \ddot{\theta}_s + C_s \dot{\theta}_s + T_{sn} + F_{Cs},$$

$$T_{sn} = K_T(\theta_s - \theta_0),$$

$$nK_{tr}i_a + K_T\theta_s = J\ddot{\theta}_0 + C\dot{\theta}_0 + K\theta_0 + F_0, \text{ and}$$

$$\theta_m = n\theta_0, \quad (4)$$

where, $$J = J_0 + n^2 J_m + \left(\frac{p}{2\pi}\right)^2 M_R,$$

$$C = C_0 + n^2 C_m + \left(\frac{p}{2\pi}\right)^2 C_R,$$

$$K = K_T + \left(\frac{p}{2\pi}\right)^2 K_R,$$

$J_s$ represents a first inertia of the steering wheel,
$J_0$ represents a second inertia of the axis of the pinion,
$J_m$ represents a third inertia of a shaft of the motor,
$C_s$ represents a first viscous friction coefficient of the steering wheel,
$C_0$ represents a second viscous friction coefficient of the axis of the pinion,
$C_m$ represents a third viscous friction coefficient of the motor,
$C_R$ represents a fourth viscous friction coefficient a fourth viscous friction coefficient of the rack,
$K_T$ represents a first spring constant of the torsion bar,
$K_R$ represents a second spring constant of the rack,
$F_{Cs}$ represents a first Coulomb friction coefficient of the steering wheel,
$F_0$ represents a second Coulomb friction coefficient of the axis of the pinion,
n represents a reduction gear ratio of the gear,
p represents a relative stroke between the pinion and the rack,
$K_{tr}$ represents a torque constant of the gear,
$M_R$ represents a mass of the rack,
$T_{sn}$ represents a rotary torque applied from the operator,
$\theta_s$ represents a steering angle of the steering wheel,
$T_s$ represents a steering torque applied from the operator,
$\theta_m$ represents a first rotation angle of the motor,
$\theta_0$ represents a second rotation angle of the axis of the pinion, and
$i_a$ represents a motor current flowing through the motor.

* * * * *